United States Patent
Marquès et al.

(10) Patent No.: US 11,135,951 B2
(45) Date of Patent: Oct. 5, 2021

(54) VEHICLE SEAT TRIM ASSEMBLY INCLUDING A FRAME SOCK

(71) Applicant: Lear Corporation, Southfield, MI (US)

(72) Inventors: José Marquès, Vaux-sur-Seine (FR);
Nathalie Navarro, Viroflay (FR);
Michele Petit, Vélizy-Villacoublay (FR)

(73) Assignee: Lear Corporation, Southfield, MI (US)

( * ) Notice: Subject to any disclaimer, the term of this patent is extended or adjusted under 35 U.S.C. 154(b) by 64 days.

(21) Appl. No.: 16/697,576

(22) Filed: Nov. 27, 2019

(65) Prior Publication Data

US 2020/0171987 A1   Jun. 4, 2020

(30) Foreign Application Priority Data

Nov. 30, 2018 (FR) ...................................... 1872149

(51) Int. Cl.
*B60N 2/58* (2006.01)
*B60N 2/20* (2006.01)

(52) U.S. Cl.
CPC .............. *B60N 2/5825* (2013.01); *B60N 2/20* (2013.01)

(58) Field of Classification Search
CPC .................................................. B60N 2/5825
See application file for complete search history.

(56) References Cited

U.S. PATENT DOCUMENTS

| | | | |
|---|---|---|---|
| 9,352,676 B1 * | 5/2016 | Wright | ..................... B60N 2/58 |
| 9,511,693 B2 | 12/2016 | Nakagawa et al. | |
| 9,580,001 B2 | 2/2017 | Sosnowski et al. | |
| 9,969,309 B2 | 5/2018 | Nakagawa et al. | |
| 9,987,960 B2 | 6/2018 | Taguchi et al. | |

FOREIGN PATENT DOCUMENTS

| | | |
|---|---|---|
| GB | 2415894 A | 1/2006 |
| WO | WO-2006033174 A1 * | 3/2006 |

* cited by examiner

*Primary Examiner* — Anthony D Barfield
(74) *Attorney, Agent, or Firm* — MacMillan, Sobanski & Todd, LLC

(57) ABSTRACT

A vehicle seat trim assembly includes a seat trim adapted to be located over a seat foam that is supported on a vehicle seat frame. The seat trim includes an occupant support surface and a side trim that is attached to the occupant support surface. The vehicle seat trim assembly also includes a frame sock. The frame sock has a cover having an attachment edge with a top attachment portion that is attached to the occupant support surface and a side attachment portion that is attached to the side trim. The frame sock includes a clip that is attached to the cover and is adapted to engage the vehicle seat frame. The frame sock also has a strap that is attached to the cover between the attachment edge and the clip. The strap is attached to the cover and to a resilient retainer.

20 Claims, 6 Drawing Sheets

VEHICLE SEAT TRIM ASSEMBLY INCLUDING A FRAME SOCK

BACKGROUND OF THE INVENTION

This invention relates to a trim component for a seat. More specifically, this invention relates to a fabric trim component to cover an articulating part of a seat.

A vehicle seat provides support, comfort, convenience, and safety for an occupant. The vehicle seat typically includes a metal frame that supports a seat foam. A seat trim is typically located around the foam and is made of a material, such as fabric or leather. The seat trim provides a protective layer for the seat foam and also improves the appearance of the vehicle seat.

A typical vehicle seat is capable of one or more adjustable movements. The vehicle seat typically includes a seat bottom that the occupant sits on and a seat back that the occupant rests his or her back against. The seat back may be rotated relative to the seat bottom to a position that is comfortable for the occupant. Also, the typical vehicle seat may be moved in fore and aft directions relative to the vehicle interior. In order to allow these various movements of the vehicle seat, the frame includes tracks that attach it to the vehicle and allow sliding motion in the fore and aft directions. An axial connection between the seat bottom and the seat back allows relative rotational movement.

The seat tracks are normally located below the seat bottom where they are not visible to the occupant. The axial connection extends to either side of the seat and is normally covered by a shield in order to improve the appearance of the vehicle seat. An example of such a shield is shown in U.S. Pat. No. 9,987,960. The shield is attached to the seat bottom and extends along the length of the seat bottom in the fore and aft directions in order to provide the vehicle seat with a uniform appearance. The shield includes an extension at the aft end that extends upwardly from the seat bottom and is positioned to the side of the seat back in order to cover and conceal the end of the axial connection. The shield remains in a fixed position relative to the seat bottom, and the seat back is able to rotate relative to the seat bottom and the shield while the axial connection remains concealed behind the shield. The shield is typically made of a plastic material that has sufficient structural strength to hold its shape and remain in position during the normal use of the vehicle seat. The shield typically has a finished appearance on an outer surface that is visible to the occupant. It would be advantageous to have an alternative way to cover the axial connection on the vehicle seat.

SUMMARY OF THE INVENTION

This invention relates to a vehicle seat trim assembly. The vehicle seat trim assembly includes a seat trim adapted to be located over a seat foam that is supported on a vehicle seat frame. The seat trim includes an occupant support surface. The seat trim also includes a side trim that is attached to the occupant support surface. The vehicle seat trim assembly also includes a frame sock. The frame sock has a cover with an attachment edge. The attachment edge includes a top attachment portion that is attached to the occupant support surface. The attachment edge also includes a side attachment portion that is attached to the side trim. The frame sock includes a clip that is attached to the cover. The clip is adapted to engage the vehicle seat frame. The frame sock also has a strap that is attached to the cover between the attachment edge and the clip. The strap is attached to the cover at a first edge and is attached to a resilient retainer at an opposed second edge.

This invention also relates to a vehicle seat frame assembly. The vehicle seat frame assembly includes a first seat frame and a second seat frame attached to the first seat frame for relative rotational movement about a seat axis. The vehicle seat frame assembly includes a first seat trim supported on the first seat frame. The first seat trim includes an occupant support surface that is adapted for engagement by an occupant. The first seat trim also includes a side trim attached to the occupant support surface. The vehicle seat frame assembly includes a frame sock. The frame sock includes a cover with an attachment edge. The attachment edge has a top attachment portion that is attached to the occupant support surface. The attachment edge also has a side attachment portion that is attached to the side trim. The seat axis passes through the cover.

This invention also relates to a vehicle seat frame assembly. The vehicle seat frame assembly includes a first seat frame with a bracket. A second seat frame is supported on the bracket for relative rotational movement about a seat axis. The bracket includes a flange that extends substantially parallel to the seat axis and toward the second seat frame. A frame space is defined between the flange and the second seat frame. The vehicle seat frame assembly includes a first seat trim supported on the first seat frame. The first seat trim includes an occupant support surface that is adapted for an occupant to engage. The first seat trim also includes a side trim attached to the occupant support surface. The vehicle seat frame assembly includes a frame sock. The frame sock has a cover positioned so that the seat axis passes through the cover. The cover has an attachment edge located on a fore side of the seat axis. The attachment edge includes a top attachment portion that is attached to the occupant support surface. The attachment edge also includes a side attachment portion that is attached to the side trim. The frame sock includes a spacer located between the cover the cover and the bracket. The frame sock also includes a clip attached to the cover. The clip is engaged with the flange on an aft side of the seat axis. The cover has a strap edge located between the top attachment portion and the clip. A strap includes a first edge that is attached to the strap edge. The strap includes a second edge that is attached to a resilient retainer. The strap has a cover portion that extends from the cover toward the second seat frame. The strap also has a retained portion that extends from the cover portion toward the cover. The retainer is attached to the retained portion of the strap, and a portion of the retainer is located in the frame space. A portion of the retainer biases the cover portion of the strap away from the seat axis. The strap includes a cover edge that is attached to the cover. The strap is longer than the cover edge so that the strap includes a first free end. The first free end is located in the frame space. The strap also includes a second free end. The second free end is located between the cover and the seat axis.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
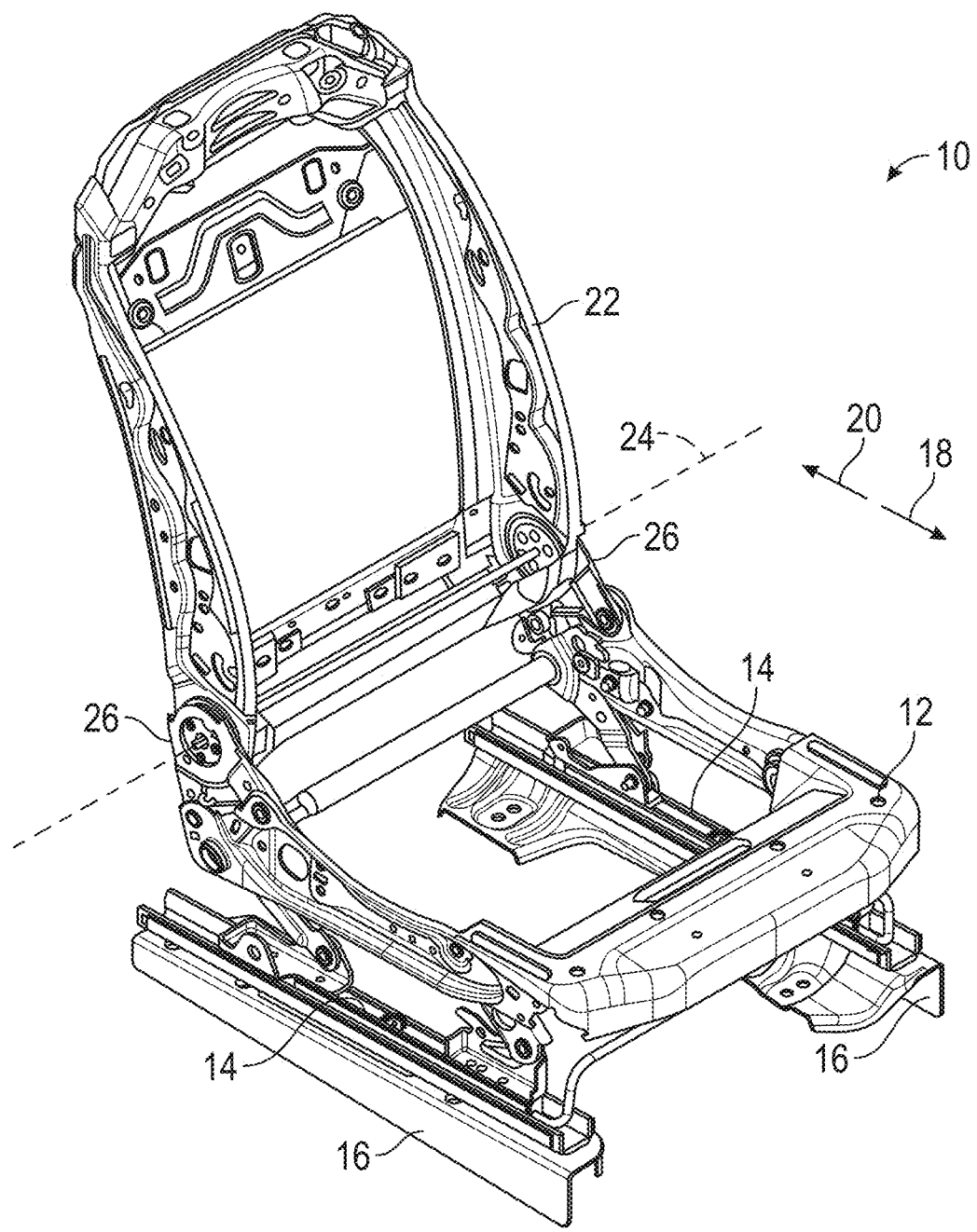
FIG. 1 is a perspective view of a vehicle seat frame.

Referring now to the drawings, there is illustrated in FIG. 1 a vehicle seat frame assembly, indicated generally at 10. The vehicle seat frame assembly 10 includes a first seat frame 12. The illustrated first seat frame 12 is a seat bottom frame, but may be any desired part of the vehicle seat frame assembly 10. The first seat frame 12 includes a mobile track 14 that is attached to a fixed frame 16 for relative movement in a fore direction 18 and an opposite aft direction 20. The fixed frame 16 is adapted to be mounted to a vehicle (not shown). The vehicle seat frame assembly 10 includes a second seat frame 22 that is attached to the first seat frame 12 for relative rotational movement about a seat axis 24. The illustrated second seat frame 22 is a seat back frame, but may be any desired part of the vehicle seat frame assembly 10. The second seat frame 22 may be supported in one of a plurality of positions relative to the first seat frame 12, as is known in the art.

Figure 2:
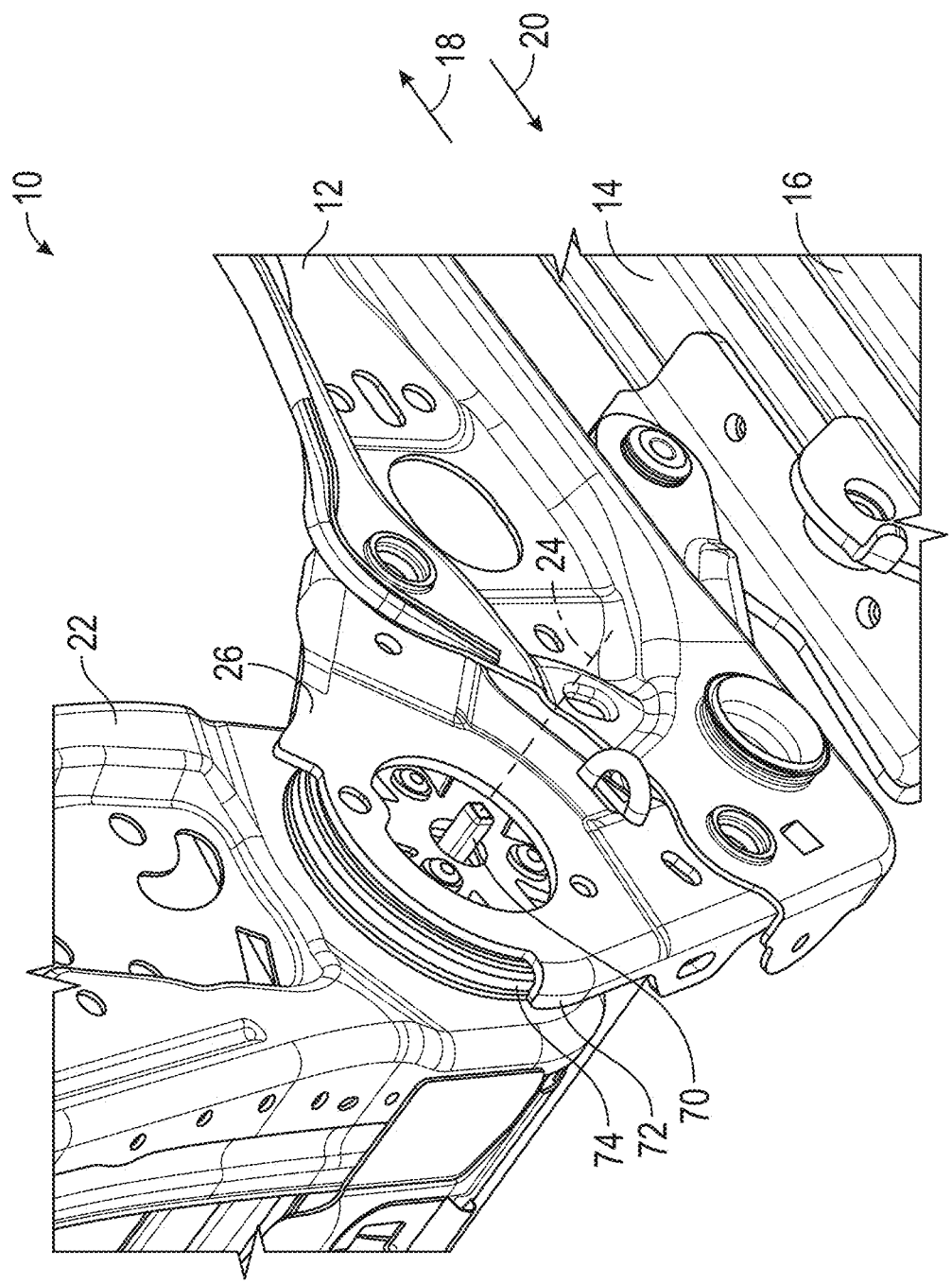
FIG. 2 is an enlarged detailed view of a portion of the vehicle seat frame illustrated in FIG. 1.

Referring to FIG. 2, there is illustrated an enlarged, detailed view of a portion of the vehicle seat frame assembly 10, viewed from behind. The vehicle seat frame assembly 10 includes a backrest bracket 26. The illustrated backrest bracket 26 is fixed relative to the first seat frame 12. The second seat frame 22 is supported by the backrest bracket 26 for relative rotational movement. As shown in FIG. 1, the vehicle seat frame assembly 10 includes two backrest brackets 26 located at opposed sides of the second seat frame 22 and used to support the second seat frame 22. The illustrated components of the vehicle seat frame assembly 10 are made of metal, but may be made of any desired material. The vehicle seat frame assembly 10 illustrated is provided as an example of one frame suitable for use of the invention described herein. However, the invention may be used with any desired vehicle seat frame.

Figure 3:
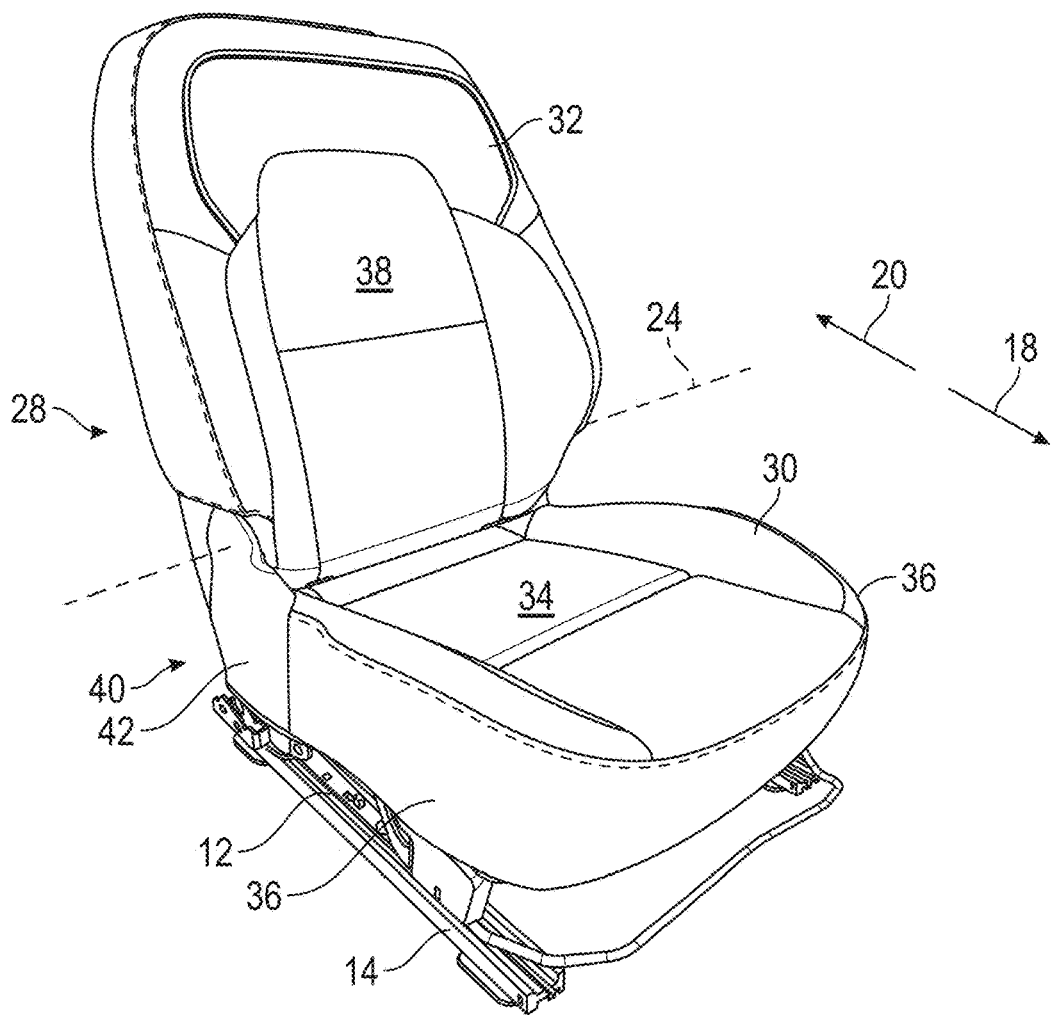
FIG. 3 is a perspective view of the vehicle seat frame shown with a trim assembly attached including a seat bottom trim and a seat back trim.

Referring to FIG. 3, there is illustrated a perspective view similar to FIG. 1, showing the seat frame 10 with a trim assembly, indicated generally at 28, attached thereto. The trim assembly 28 includes a first seat trim 30 and a second seat trim 32. The illustrated first seat trim 30 and second seat trim 32 are made of cloth fabric and leather, but the first seat trim 30 and the second seat trim 32 may be made of any desired materials. The first seat trim 30 and the second seat trim 32 are located over seat foams (not shown) that are supported on the vehicle seat frame assembly 10, as is known in the art.

The first seat trim 30 includes a first occupant support surface 34, which is the part of the first seat trim 30 that an occupant is normally seated upon. The first seat trim 30 also includes first side trims 36 that are located on opposed sides of the first seat frame 12. The first side trims 36 are provided to conceal and protect the underlying seat foam. The second seat trim 32 includes a second occupant support surface 38, which is the part of the second seat trim 32 that the occupant normally rests his or her back upon. The trim assembly 28 also includes a frame sock, indicated generally at 40, which will be described in detail below.

Figure 4:
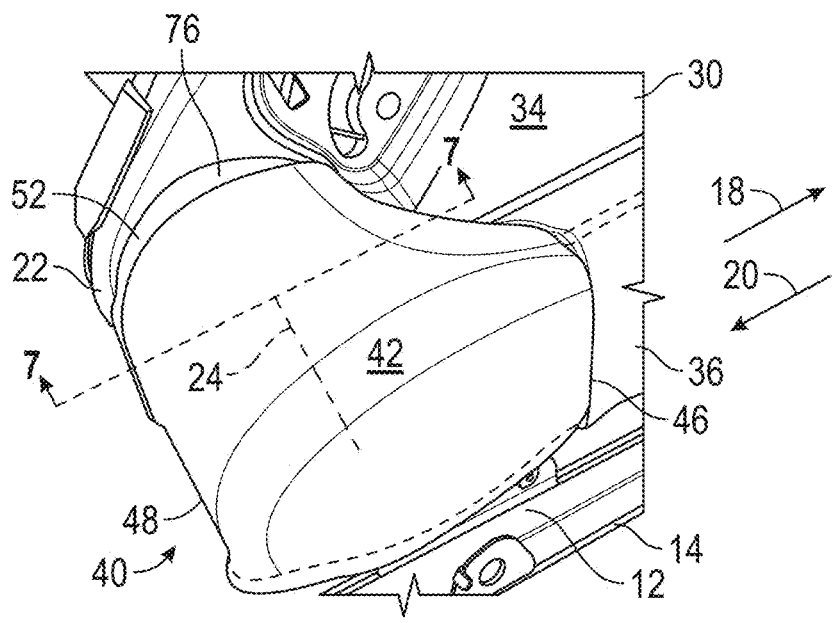
FIG. 4 is an enlarged detailed view of a portion of the seat bottom trim illustrated in FIG. 3 including a frame sock.

Referring now to FIG. 4, there is illustrated a perspective view similar to FIG. 2, with the first seat trim 30 and the frame sock 40 shown installed on the vehicle seat frame assembly 10. In the illustrated embodiment, the frame sock 40 is attached to the first seat trim 30. However, the frame sock 40 may be attached to the second seat trim 32 or any other desired part of the trim assembly 28. The frame sock 40 includes a sock A-surface 42, which is a surface of the frame sock 40 that is normally visible to the occupant when the trim assembly 28 is installed on the vehicle seat frame assembly 10. The illustrated sock A-surface 42 is made of a cloth fabric, but may be any desired material having any desired appearance.

Figure 5:
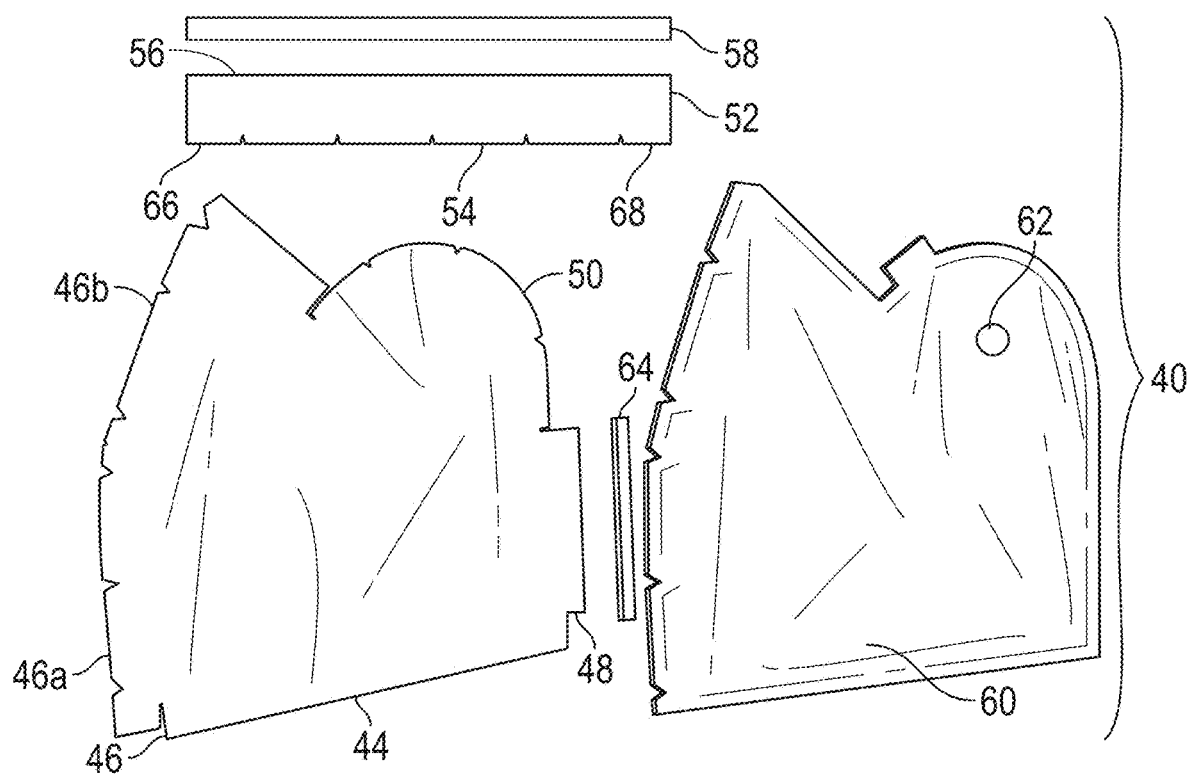
FIG. 5 is an exploded view of the frame sock.

Referring now to FIG. 5, there is shown an exploded view of the frame sock 40. The frame sock 40 is shown from behind in FIG. 5, and the sock A-surface 42 is not visible. The frame sock 40 includes a cover 44. The illustrated cover 44 is made of a flexible cloth fabric, but may be made of any desired material. The cover 44 has an irregular shape, and the cover 44 may have any desired shape to allow the frame sock 40 to be positioned on the vehicle seat frame assembly 10, as will be described below. The cover 44 includes an attachment edge 46 that will be attached to the first seat trim 30. The attachment edge 46 includes a side attachment portion 46a and a top attachment portion 46b. The cover 44 includes a clip edge 48 that is located at the opposite side of the cover 44 from the attachment edge 46. The cover 44 also includes a strap edge 50 that is located between the attachment edge 46 and the clip edge 48. The illustrated strap edge 50 has a curved shape, but may have any desired shape.

The frame sock 40 includes a strap 52. The illustrated strap 52 is made of a flexible cloth fabric and is made of the same material as the cover 44. However, the strap 52 may be made of any desired material. The illustrated strap 52 has a rectangular shape, but may have any desired shape. The strap 52 includes a cover edge 54 that has a length greater than the strap edge 50 on the cover 44. The strap 52 includes a retainer edge 56 that is located on the opposite side of the strap 52 from the cover edge 54.

The frame sock 40 includes a retainer 58 that is made of a resilient material. The illustrated retainer 58 is made of plastic, but may be made of any desired material. The illustrated retainer 58 has a rectangular shape and has the same length as the retainer edge 56 of the strap 52, but may be any desired shape and size.

The frame sock 40 also includes a spacer 60. The spacer 60 serves to provide a separation layer between the cover 44 and the vehicle seat frame assembly 10. The spacer 60 is made of a relatively thick, relatively rigid material and has a shape similar to the cover 44. However, the spacer 60 may be made of any desired material and may have any desired shape or size. The spacer 60 includes an optional axle opening 62. The illustrated axle opening 62 has a circular shape and passes through the entire thickness of the spacer 60, but the axle opening 62 may have any desired shape and size.

The frame sock 40 also includes a clip 64. The clip 64 serves to retain the frame sock 40 in position relative to the vehicle seat frame assembly 10, as will be described below. The illustrated clip 64 is a J-clip, but may be any desired retainer. The illustrated embodiment includes one clip 64, but any desired number of clips may be used.

Figure 6:
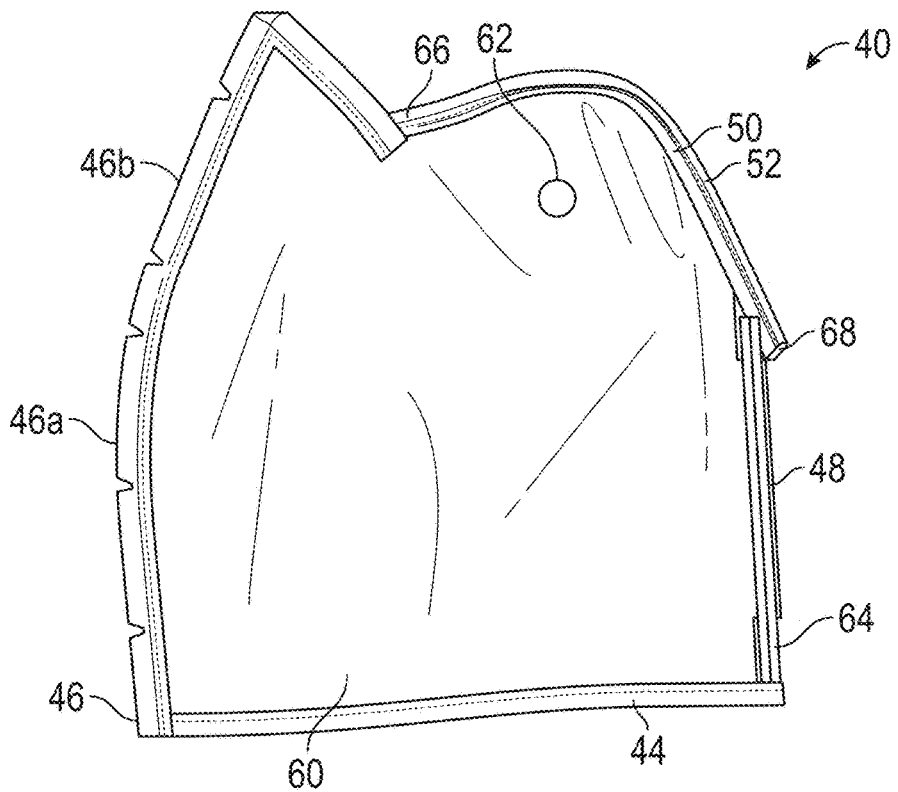
FIG. 6 is a view of the assembled frame sock showing a B-surface thereof.

Referring to FIG. 6, a view of the assembled frame sock 40 is shown. The view illustrated in FIG. 6 is shown from the same side as FIG. 5, and the sock A-surface 42 is not visible. In order to assemble the frame sock 40, the strap edge 50 of the cover 44 is attached to the cover edge 54 of the strap 52. In the illustrated embodiment, the cover 44 and the strap 52 are attached by sewing, but any desired attachment structure may be used. As previously described, the cover edge 54 of the strap 52 is longer than the strap edge 50 of the cover 44. When the strap 52 is attached to the cover 44, the strap 52 includes a first free end 66 and a second free end 68 that are not attached to the cover 44. The first free end 66 is located near the clip edge 48 of the cover 44, and the second free end 68 is located near the attachment edge 46 of the cover 44. Additionally, as previously described, the strap edge 50 has a curved shape. Thus, the part of the strap 52 that includes the cover edge 54 will have a similarly-curved shape. The first free end 66 and the second free end 68 extend from this curved part of the strap 52.

The retainer 58 is attached to the retainer edge 56 of the strap 52. In the illustrated embodiment, the strap 52 and the retainer 58 are attached by sewing, but any desired attachment structure may be used. The retainer 58 has the same length at the strap 52 and extends from the first free end 66 to the second free end 68. As previously described, the strap 52 extends from the cover 44 along a curved path defined by the strap edge 50. The retainer 58 is bent into a similarly shaped curve. However, the portions of the retainer 58 attached to the first free end 66 and the second free end 68 are able to remain relatively straight.

The spacer 60 is attached to the cover 44 on the side opposite the sock A-surface 42. In the illustrated embodiment, the cover 44 and the spacer 60 are attached by sewing, but any desired attachment structure may be used. The spacer 60 is positioned on the cover 44 so that the illustrated axle opening 62 is located at the center of the curve of the strap edge 50. However, the axle opening 62 may be in any desired location. Additionally, the clip 64 is attached to the clip edge 48 of the cover 44. In the illustrated embodiment, the cover 44 and the clip 64 are attached by sewing, but any desired attachment structure may be used.

As shown in FIG. 4, the attachment edge 46 of the cover 44 is attached to the first seat trim 30. In the illustrated embodiment, the first seat trim 30 and the frame sock 40 are attached by sewing, but any desired attachment structure may be used. In the illustrated embodiment, the side attachment portion 46a is attached to the first side trim 36, and the top attachment portion 46b is attached to the first occupant support surface 34. However, the frame sock 40 may be attached to any desired part of the first seat trim 30. When the trim assembly 28 is attached to the vehicle seat frame assembly 10, the attachment edge 46 is located in the fore direction 18 of the seat axis 24.

Figure 7:
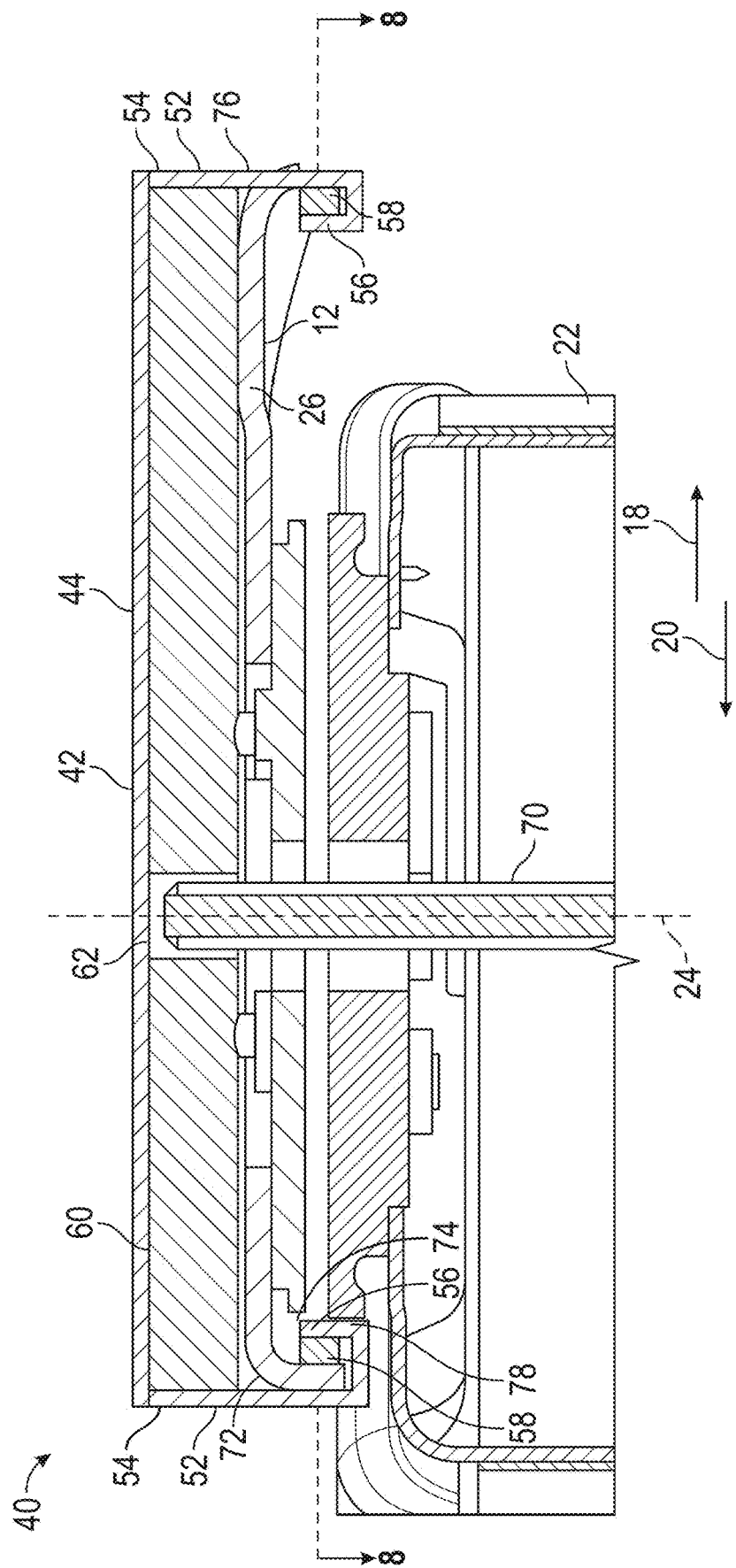
FIG. 7 is a cross-sectional view taken along line 7-7 of FIG. 4.
Figure 8:
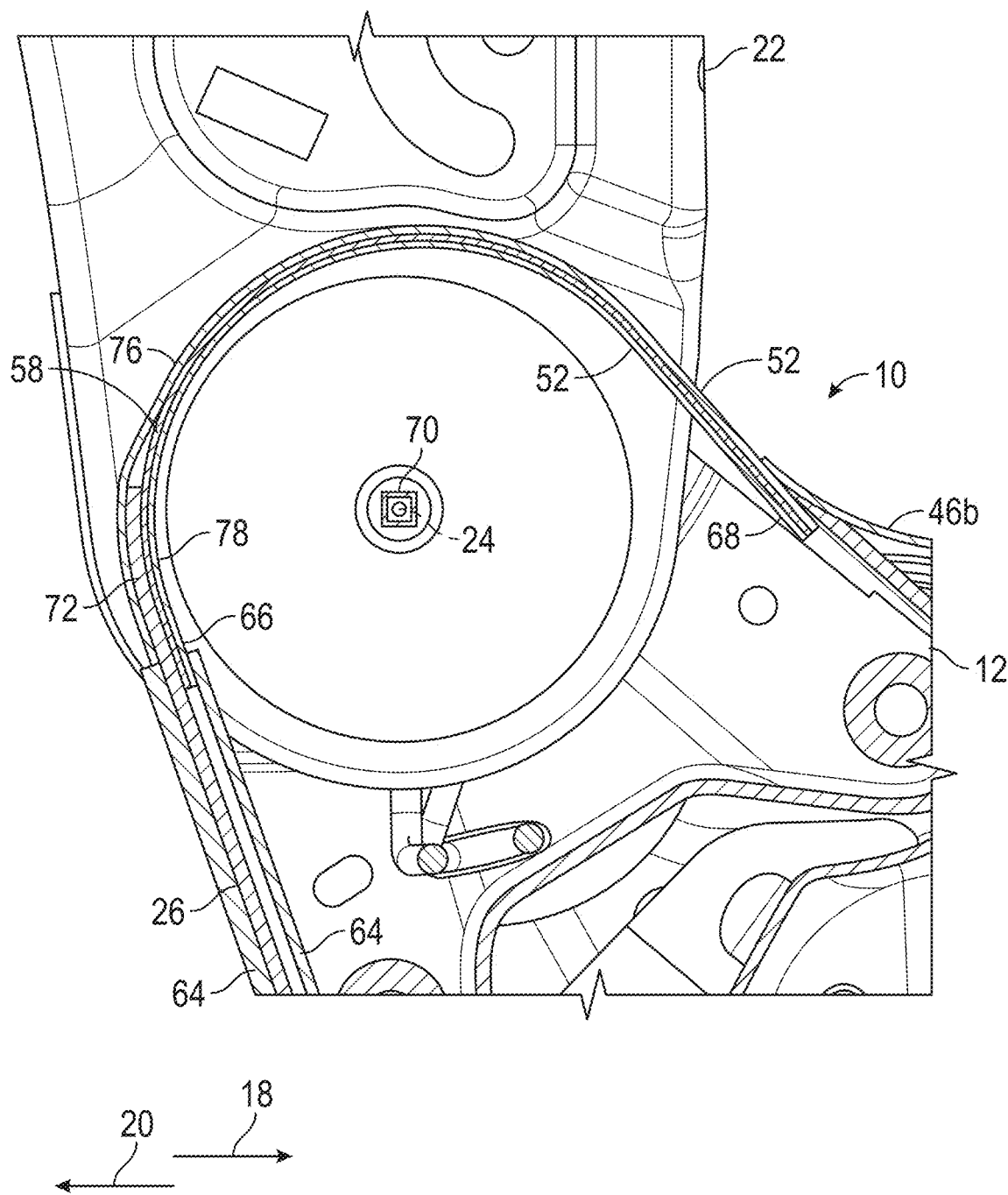
FIG. 8 is a cross-sectional view taken along line 8-8 of FIG. 7.

Referring to FIG. 7, a cross-sectional view taken along line 7-7 of FIG. 4 is illustrated. The cross-section shown in FIG. 7 is taken parallel to and through the seat axis 24. FIG. 8 is a cross-sectional view taken along line 8-8 of FIG. 7. When the frame sock 40 is attached to the vehicle seat frame assembly 10, the spacer 60 is positioned adjacent the backrest bracket 26 so that an axle 70 on the second seat frame 22 is located in the axle opening 62. The axle 70 extends along the seat axis 24 and extends past the backrest bracket 26. The spacer 60 has a thickness that is large enough so that the axle 70 does not engage the cover 44. However, the spacer 60 may have any desired thickness. When the cover 44 is positioned over the spacer 60, the spacer 60 is located between the cover 44 and the backrest bracket 26.

The backrest bracket 26 of the first seat frame 12 includes a flange 72 that extends substantially parallel to the seat axis 24 and toward the second seat frame 22. The flange 72 is located in the aft direction 20 from the seat axis 24. A frame space 74 is defined between the flange 72 and the second seat frame 22. The strap 52 extends from the cover 44 toward the second seat frame 22, creating a cover portion 76 of the strap 52. As best shown in FIG. 4, the cover portion 76 extends from the cover 44 toward the second seat frame 22 and conceals the backrest bracket 26.

Referring back to FIGS. 7 and 8, the strap 52 is folded toward the seat axis 24 and then back toward the cover 44, creating a retained portion 78 of the strap 52. The retainer edge 56 and the retainer 58 are located on the retained portion 78. The retainer 58 is placed in the frame space 74 between the flange 72 and the seat axis 24. In the illustrated embodiment, this is done by inserting the first free end 66 of the strap 52 into the frame space 74, and then moving the strap 52 relative to the vehicle seat frame assembly 10, downwardly as viewed in FIG. 8.

As previously described, the retainer 58 is resilient and is bent into the curved shape shown in FIG. 7. Thus, the retainer 58 is biased to rebound to a straight shape and presses against the flange 72. Additionally, the free ends 66 and 68 are biased away from the seat axis 24. The part of the retainer 58 from the flange 72 to the second free end 68 presses away from the seat axis 24 and pushes the strap 52 away from the seat axis 24. This maintains the shape of the frame sock 40 shown in FIG. 4.

As shown in FIG. 4, the portion of the cover adjacent to the clip edge 48 is wrapped around the flange 72, and the clip 64 is attached to the first seat frame 12. In the illustrated embodiment, the clip 64 is attached to the flange 72 of the backrest bracket 26. However, the clip 64 may be attached to any desired part of the vehicle seat frame assembly 10. The clip 64 retains the frame sock 40 in position relative to the vehicle seat frame assembly 10. The clip 64 engages the vehicle seat frame assembly 10 in the aft direction 20 from the seat axis 24. The clip 64 engages the first seat frame 12 to retain the frame sock 40 in position relative to the first seat frame 12.

The frame sock 40 provides a cover and concealment for the vehicle seat frame assembly 10 that has a fabric texture and appearance. The frame sock 40 remains in position relative to the first seat frame 12 when the first seat frame 12 is moved relative to the fixed frame 16 and when the second seat frame 22 is moved relative to the first seat frame 12. The frame sock 40 is retained in position on the first seat frame 12 by the engagement of the attachment edge 46 with the first seat trim 30 and the engagement of the clip 64 with the first seat frame 12. The frame sock 40 is wrapped around the flange 72 and the retainer 58 in order to conceal the underlying vehicle seat frame 10, and further to allow movement of the second seat frame 22 relative to the first seat frame 12.

The principle and mode of operation of this invention have been explained and illustrated in its preferred embodiment. However, it must be understood that this invention may be practiced otherwise than as specifically explained and illustrated without departing from its spirit or scope.

What is claimed is:
1. A vehicle seat trim assembly comprising:
a seat trim adapted to be located over a seat foam that is supported on a vehicle seat frame, the seat trim including an occupant support surface and a side trim attached to the occupant support surface; and a frame sock including a cover having an attachment edge with a top attachment portion that is attached to the occupant support surface and a side attachment portion that is attached to the side trim, a clip attached to the cover and adapted to engage the vehicle seat frame, and a strap attached to the cover between the attachment edge and the clip, wherein the strap is attached to the cover at a first edge and attached to a resilient retainer at an opposed second edge.

2. The vehicle seat trim assembly of claim 1, wherein the strap includes a cover edge that is attached to the cover, is longer than the cover edge, includes a first free end that is not attached to the cover and is located adjacent the clip, and includes a second free end that is not attached to the cover and is located adjacent the attachment edge.

3. A vehicle seat frame assembly comprising:
a first seat frame;
a second seat frame attached to the first seat frame for relative rotational movement about a seat axis;
a first seat trim supported on the first seat frame, the first seat trim including an occupant support surface that is adapted for an occupant to engage and a side trim attached to the occupant support surface; and
a frame sock including a cover with an attachment edge with a top attachment portion that is attached to the occupant support surface and a side attachment portion that is attached to the side trim, wherein the seat axis passes through the cover.

4. The vehicle seat frame assembly of claim 3, wherein the frame sock includes a strap that is attached to the cover at a first edge and is attached to a resilient retainer at an opposed edge, and wherein the retainer is engaged with the first seat frame.

5. The vehicle seat frame assembly of claim 4, wherein the first seat frame includes a bracket that supports the second seat frame and includes a flange that extends substantially parallel to the seat axis and toward the second seat frame so that a frame space is defined between the flange and the second seat frame, and wherein a portion of the retainer is located in the frame space.

6. The vehicle seat frame assembly of claim 5, wherein the attachment edge is located on a fore side of the seat axis, and wherein the portion of the retainer that is located in the frame space is located on an aft side of the seat axis.

7. The vehicle seat frame assembly of claim 4, wherein the strap includes a cover portion that extends from the cover toward the second seat frame and a retained portion that extends from the cover portion toward the cover.

8. The vehicle seat frame assembly of claim 7, wherein the retainer is attached to the retained portion of the strap.

9. The vehicle seat frame assembly of claim 8, wherein a portion of the retained portion of the strap is located in the frame space.

10. The vehicle seat frame assembly of claim 9, wherein a portion of the retainer biases the cover portion of the strap away from the seat axis.

11. The vehicle seat frame assembly of claim 4, wherein the strap includes a cover edge that is attached to the cover and is longer than the cover edge so that the strap includes a first free end that is located in the frame space.

12. The vehicle seat frame assembly of claim 11, wherein the strap includes a second free end that is located between the cover and the seat axis.

13. The vehicle seat frame assembly of claim 3, wherein the frame sock includes a clip attached to the cover and engaged with the vehicle seat frame.

14. The vehicle seat frame assembly of claim 13, wherein the attachment edge is located on a fore side of the seat axis and the portion of the clip is located on an aft side of the seat axis.

15. The vehicle seat frame assembly of claim 14, wherein the strap is attached to the cover between the attachment edge and the clip.

16. The vehicle seat frame assembly of claim 15, wherein the frame sock includes a clip that is attached to the cover and engaged with the vehicle seat frame.

17. The vehicle seat frame assembly of claim 16, wherein the strap is attached to the cover between the attachment edge and the clip.

18. The vehicle seat frame assembly of claim 5, wherein the frame sock includes a spacer located between the cover the cover and the bracket.

19. The vehicle seat frame assembly of claim 18, wherein the spacer includes an axle opening and an axle on the second seat frame extends into the axle opening.

20. A vehicle seat frame assembly comprising:
a first seat frame including a bracket;
a second seat frame supported on the bracket for relative rotational movement about a seat axis, wherein the bracket includes a flange that extends substantially parallel to the seat axis and toward the second seat frame so that a frame space is defined between the flange and the second seat frame;
a first seat trim supported on the first seat frame, the first seat trim including an occupant support surface that is adapted for an occupant to engage and a side trim attached to the occupant support surface; and
a frame sock including a cover positioned so that the seat axis passes through the cover, the cover including an attachment edge located on a fore side of the seat axis, a top attachment portion that is attached to the occupant support surface, and a side attachment portion that is attached to the side trim, wherein:
the frame sock includes a spacer located between the cover the cover and the bracket,
the frame sock includes a clip attached to the cover and engaged with the flange on an aft side of the seat axis,
the cover includes a strap edge located between the top attachment portion and the clip,
the frame sock includes a strap having a first edge that is attached to the strap edge and a second edge that is attached to a resilient retainer,
the strap includes a cover portion that extends from the cover toward the second seat frame and a retained portion that extends from the cover portion toward the cover,
the retainer is attached to the retained portion of the strap, a portion of the retainer is located in the frame space, and a portion of the retainer biases the cover portion of the strap away from the seat axis, and
the strap includes a cover edge that is attached to the cover and the strap is longer than the cover edge so that the strap includes a first free end that is located in the frame space and a second free end that is located between the cover and the seat axis.

* * * * *